United States Patent
Nellen et al.

(10) Patent No.: US 9,233,600 B2
(45) Date of Patent: Jan. 12, 2016

(54) ROOF ASSEMBLY AND VEHICLE COMPRISING SUCH ROOF ASSEMBLY

(71) Applicant: Inalfa Roof Systems Group B.V., Venray (NL)

(72) Inventors: Marcel Johan Christiaan Nellen, Merselo (NL); Nicolas Philippe Jesus Reynaud, Kleve (DE); Robert Rikkert, Nuenen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/453,157

(22) Filed: Aug. 6, 2014

(65) Prior Publication Data

US 2015/0076869 A1 Mar. 19, 2015

(30) Foreign Application Priority Data

Aug. 7, 2013 (EP) .................................... 13179509

(51) Int. Cl.
*B60J 7/22* (2006.01)
*B60J 7/047* (2006.01)
(Continued)

(52) U.S. Cl.
CPC .............. *B60J 7/0046* (2013.01); *B60J 7/0435* (2013.01); *B60J 7/22* (2013.01)

(58) Field of Classification Search
CPC .................................. B60J 7/22; B60J 7/0435
USPC ................. 296/217, 216.02–216.05
See application file for complete search history.

(56) References Cited

U.S. PATENT DOCUMENTS 6,457,769 B2 * 10/2002 Hertel et al. ............... 296/217
7,862,109 B2 1/2011 Geerets
(Continued)

FOREIGN PATENT DOCUMENTS

DE 10304506 A1 8/2004
DE 102008006344 B3 4/2009
(Continued)

OTHER PUBLICATIONS

European Search Report dated Jan. 27, 2014 for foreign corresponding European Application No. 13179509.8, filed Aug. 7, 2013.

*Primary Examiner* — Dennis H Pedder
(74) *Attorney, Agent, or Firm* — Steven M. Koehler; Westman, Champlin & Koehler, P.A.

(57) ABSTRACT

A roof assembly for a vehicle comprises a stationary part and at least one rigid panel. The panel is movable between a closed position and a rear position. A downwardly extending side cover is connected to side edges of said panel and to the stationary part. The side cover hides an operating mechanism from a side view and has front and rear ends. The side cover is substantially stationary with respect to the stationary part and is slidably guided in a guide rail. The guide rail only starts at a distance from the front end of the cover when the panel is in its closed position. This distance is minimally $B_{min}$ and maximally:

$$A_{max} = L - S - B_{min}$$

wherein:
L=Length of side cover
S=maximum sliding movement of guide rail of panel
$B_{min}$=Minimum overlap between side cover and guide rail in rear position of panel.

19 Claims, 12 Drawing Sheets

(51) Int. Cl.
*B60J 7/00* (2006.01)
*B60J 7/043* (2006.01)

(56) References Cited

U.S. PATENT DOCUMENTS 8,118,356 B2 * 2/2012 Holzel ..................... 296/216.03
8,220,868 B2 * 7/2012 Fraley .......................... 296/217
2006/0080903 A1 * 4/2006 Boehm et al. .................... 52/64
2013/0161983 A1 6/2013 Geurts

FOREIGN PATENT DOCUMENTS

DE 102011119991 B3 5/2012
DE 102012100298 B3 6/2012

* cited by examiner

ROOF ASSEMBLY AND VEHICLE COMPRISING SUCH ROOF ASSEMBLY

BACKGROUND

The discussion below is merely provided for general background information and is not intended to be used as an aid in determining the scope of the claimed subject matter.

Aspects of the present invention relate to a roof assembly for a vehicle having an opening in its fixed roof, which roof assembly comprises a stationary part and at least one rigid panel movably supported by the stationary part through an operating mechanism, which panel is movable between a closed position, in which it closes the opening in the fixed roof, and an open position, in which it is moved with its rear side upwardly and slid rearwardly, wherein a downwardly extending side cover is connected to side edges of said panel and to the stationary part, which side cover hiding the operating mechanism from a side view, the side cover being substantially stationary in longitudinal direction with respect to the stationary part and being slidably guided in a guide rail on the panel, said guide rail being configured to guide the side cover in vertical and lateral directions.

A roof assembly of this kind is for example known from U.S. Pat. No. 7,862,109. In this prior art roof assembly, the side covers are integrally connected on their lower sides to the stationary part. The upper sides of the side covers are configured to be in sliding engagement with the panel. Thus, the panel may be moved in longitudinal direction while the side cover is kept stationary.

Such structure is satisfactory with rectangular panels where the sliding movement of the panel is substantially parallel to the side edges of the panel. With non-rectangular panels, in particular wide panels that follow the curvature of the side beams of the vehicle (which flare out to the front side of the vehicle) such guide rails below the panel cannot follow the side curvature of the panel as this would necessitate a substantial lateral movement of the side cover, which may not be possible or pose technical problems, especially if the cover is already curved in other directions.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In one aspect herein disclosed, a roof assembly for a vehicle has a guide rail that only starts at a distance A from the front end of the cover when the panel is in its closed position, said distance A being minimally $B_{min}$ and maximally:

$$A_{max} = L - S - B_{min}$$

wherein:
L=Length of side cover
S=maximum sliding movement of the guide rail of the panel
$B_{min}$=Minimum overlap between the side cover and guide rail in the rear position of the panel Due to the guide rail being terminated at a distance from the front side of the panel, it is possible to use this guide rail also with panels having curved sides because the guide rail only has to follow a part of the lateral curvature of the panel sides. It does not have to follow a curvature at the front side of the panel which may be relatively strong. The minimum and maximum values of the distance between the front end of the guide rail and the front end of the side cover is chosen such that the guide rail still has sufficient overlap with the side cover in its rear position. A proper engagement between the guide rail and the side cover is then maintained at all times.

An auxiliary guide may be provided near the front of the panel guiding the side cover in a vertical direction only The auxiliary guide, such as some kind of clip, holds the side cover in the vertical direction but allows the side cover to follow another path than the lateral curvature of the panel side edge. Thus the side cover is not forced to follow this strong curvature in a lateral direction, and is thus not deformed to an unacceptable level when opening the panel, which could especially be the case if the side cover is curved in different directions.

In one embodiment, the auxiliary guide is positioned at a distance from the guide rail that is in the sliding direction of the panel. In this embodiment, the guidance of the side cover is minimized, but still sufficient to prevent rattling.

The side cover may be provided with a guide member near its upper side, the guide member being configured to be guided by the guide rail and auxiliary guide. In this embodiment, the side cover may be provided with a reinforcing element at or near the guide member. This reinforcing element enables a relatively long unsupported length between the guide rail and the auxiliary guide without a risk of sagging or other deformation of the side cover. The reinforcement element may be an insert, for example from spring steel, but may also be a different, i.e. more rigid, plastic, made in 2K injection molding, for example.

The auxiliary guide may comprise a biasing element, biasing the cover in a downward direction when the panel is in a position with its rear side upwardly, and allowing to be pressed against the lower side of the panel when the panel is in its closed position.

In this embodiment, the auxiliary guide is movable in a vertical direction, which is favorable in forward positions of the panel. The auxiliary guide is then close to a point where the upper front side of the side cover is fixed. If the panel is then opened with its front side in an upward direction, this could lead to unacceptable deformations of the side cover between the fixed front side and the front of the auxiliary guide. If the auxiliary guide can move with respect to the panel in a vertical direction, it can remain in a downward position when the panel is moved upwardly from the closed position, thereby reducing deformation of the side cover, especially if there is a distance between the guide rail and the auxiliary guide. If the biasing direction of the biasing element is downwardly, the auxiliary guide and thereby the guide member of the side cover is held at a distance below the lower side of the panel, so that the risk of rattling is further reduced. However, the biasing may also be in upward direction, still allowing vertical movement between the auxiliary guide and the panel.

The guide rail and/or auxiliary guide may be provided with at least a flared edge on its front and/or rear end to prevent wear of the side cover when it is deformed due to dynamic circumstances, such as wind load around the vehicle, when entering the guide rail.

It is advantageous if the guide member extends along substantially the entire length of the cover, but is interrupted in a longitudinal direction. This promotes cleaning of the guide rail by the guide member. In addition or alternatively, the guide rail may be open in a downward direction, for example if the guide rail has one or more openings, at least in the downward direction so that moisture and dirt can be drained-off.

The cover may be provided with at least two folding lines to fold the cover in a zigzag fashion when the panel is moved to its closed position in the opening in the fixed roof. The upper portion thereof may extend substantially parallel to the panel, and may be provided with the guide member at its free end.

The panel may include an at least partly transparent sheet material and an edge of encapsulating material extending downwardly from the sheet material at least on the side edges of the panel to mainly cover the guide rail. This encapsulating material hides the guide rail below the panel from view, and might also hide any interruption between guide rail and auxiliary guide at least partly.

An aspect of the invention furthermore comprises a vehicle comprising the above-described roof assembly.

BRIEF DESCRIPTION OF THE DRAWINGS

Aspects of the invention will be explained in more detail hereafter with reference to the drawings, which schematically show embodiments of the invention.

DETAILED DESCRIPTION OF THE ILLUSTRATIVE EMBODIMENTS

Figure 1:
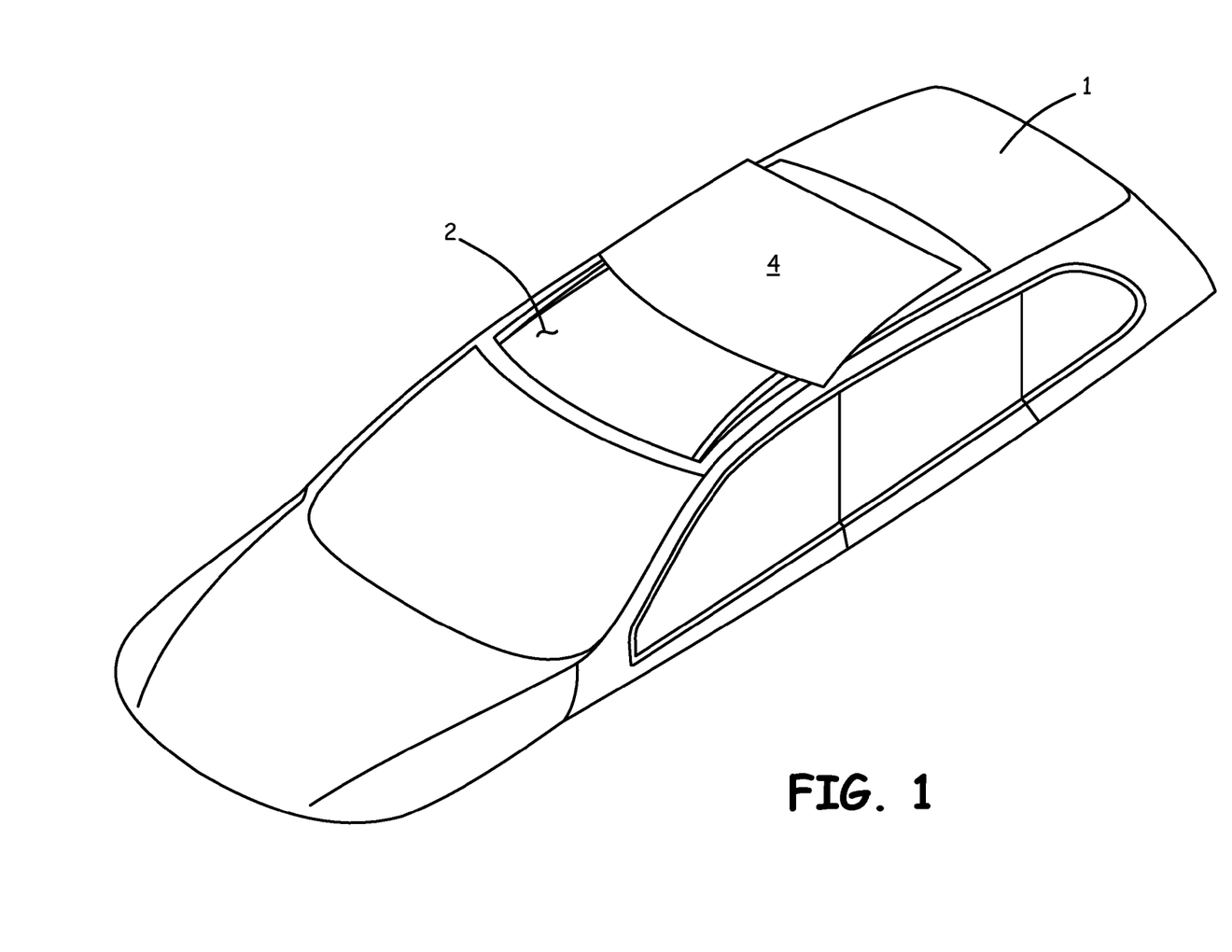
FIG. 1 is a schematic perspective view of a part of a vehicle comprising the roof assembly.

The drawing, and in first instance FIG. 1, shows a vehicle, in particular a motor vehicle such as a passenger car or utility vehicle, having a fixed roof 1 in which a roof opening 2 is provided for the purpose of accommodating a roof assembly. The roof assembly may also replace the complete roof section of the vehicle, and is then directly mounted on the side beams for the roof of the vehicle.

As is also shown in FIGS. 1-9, the roof assembly comprises a panel 4 which is movably supported, in a manner which is not shown, by a frame 3 or similar stationary part, which panel 4 comprises a transparent glass sheet 5 in this exemplary embodiment. Panel 4 has a non-rectangular shape in plan view, but follows more or less the shape of the side and front beams of the vehicle. In this case, panel 4 is wider at the front than at the back and flares out to the front with curved sides in plan view. It is also conceivable that the front side of the panel 4 is smaller in width compared to the back side. The complete panel 4 is curved in three dimensions (3D), as is particularly shown in FIGS. 2 and 4. Panel 4 may also have different forms or be made from a different material, such as plastic.

Panel 4 is positioned within roof opening 2 in its closed position, in which position it forms a seal by means of a sealing section (not shown). The sealing section may be formed on stationary part 3 or on panel 4. An encapsulation 6 is formed on the circumferential edge of panel 4 in this embodiment, and forms a downwardly extending flange 7 terminating a distance below the underside of the adjacent glass panel sheet 5

Figure 2:
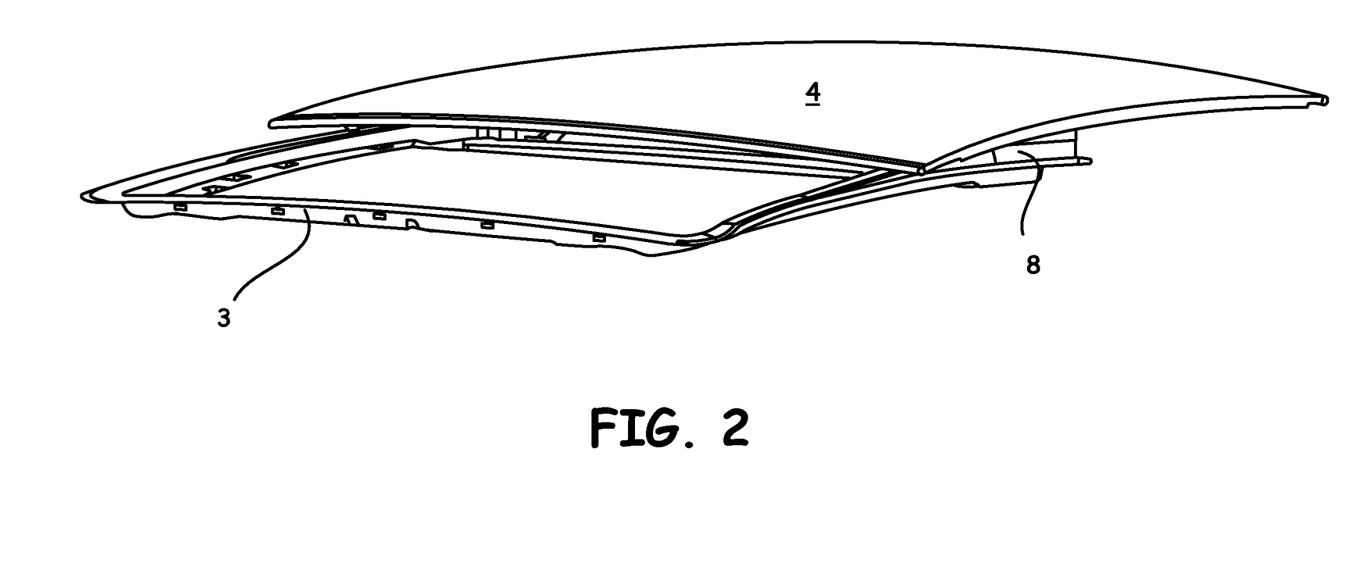
FIG. 2 is a larger-scale, perspective view of the roof assembly from the vehicle of FIG. 1.
Figure 4:
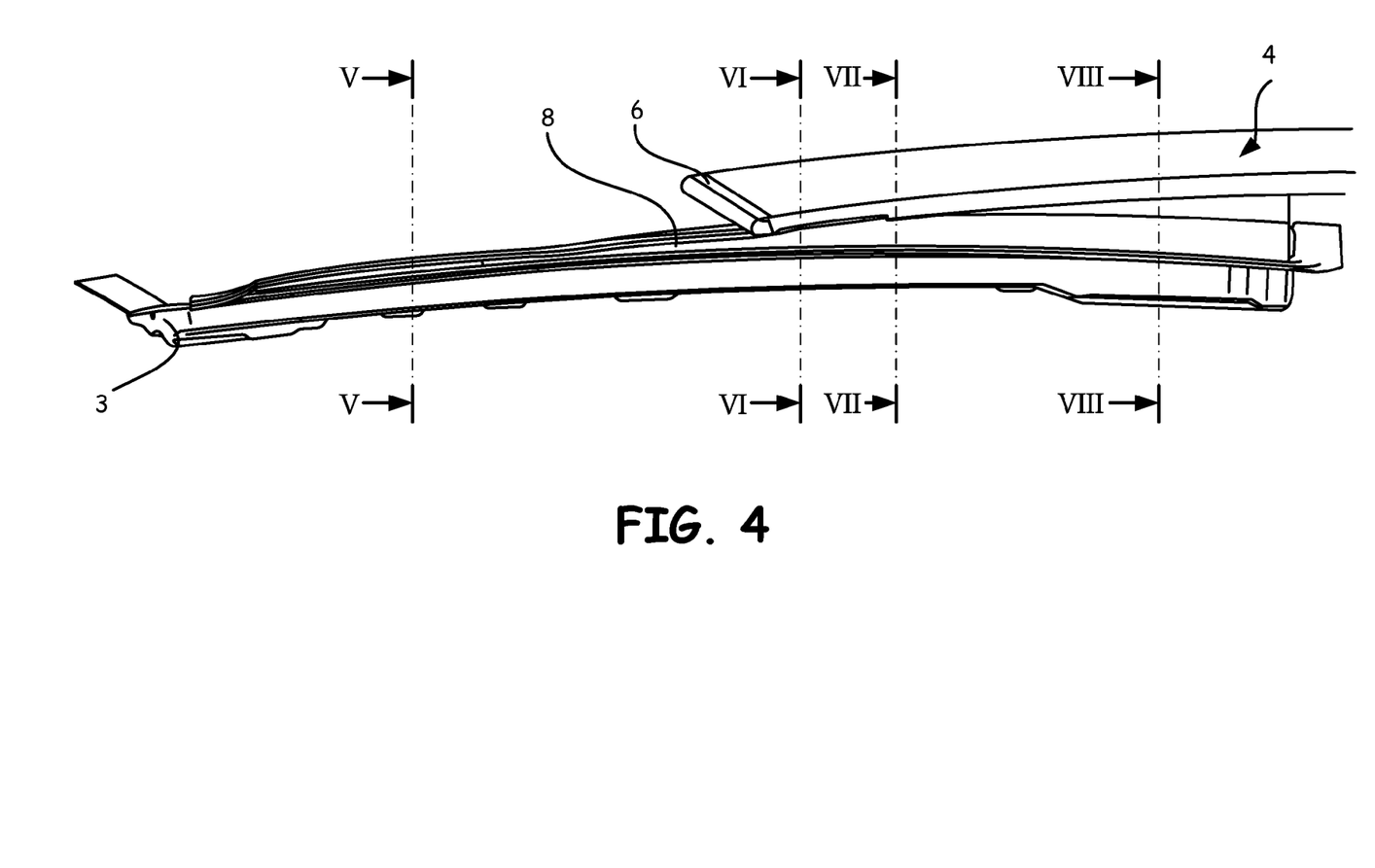
FIG. 4 is a larger scale side view of the roof assembly of FIG. 2.

From its closed position in roof opening 2 (FIG. 9), panel 4 can move at least with its rear side upwardly to a venting position, in which position panel 4 slopes upwardly from the front to the rear (FIGS. 2 and 4). To this end, panel 4 substantially pivots about a pivot axis which is positioned near the front edge of panel 4. Of course the panel 4 could also be moved upwards in a different manner. As FIG. 1 shows, panel 4 is also capable of being moved rearwardly, so as to effect a sliding movement of the panel 4, wherein panel 4 is moved above the portion of the fixed roof 1 which is behind the roof opening 2. It is also possible that this portion behind the roof opening 2 is formed by another panel, either fixed or movable. In the exemplary embodiment of FIG. 1 a fixed panel is provided.

Figure 8:
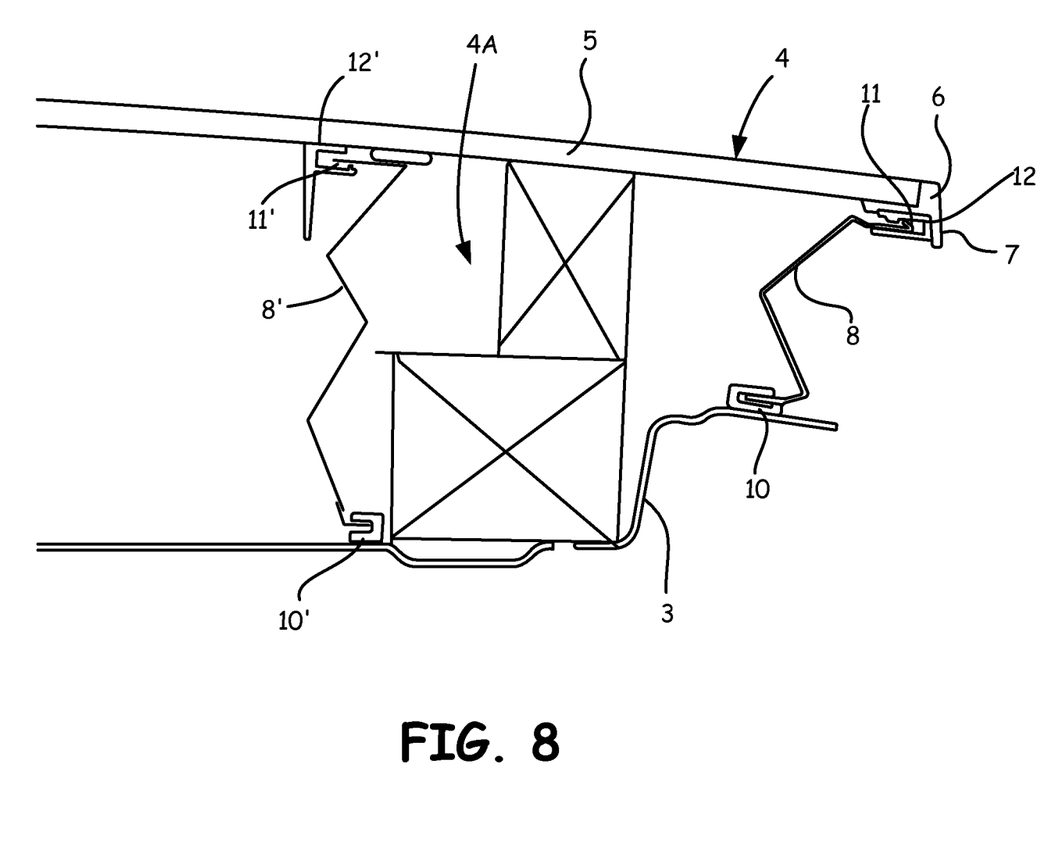
Figure 9:
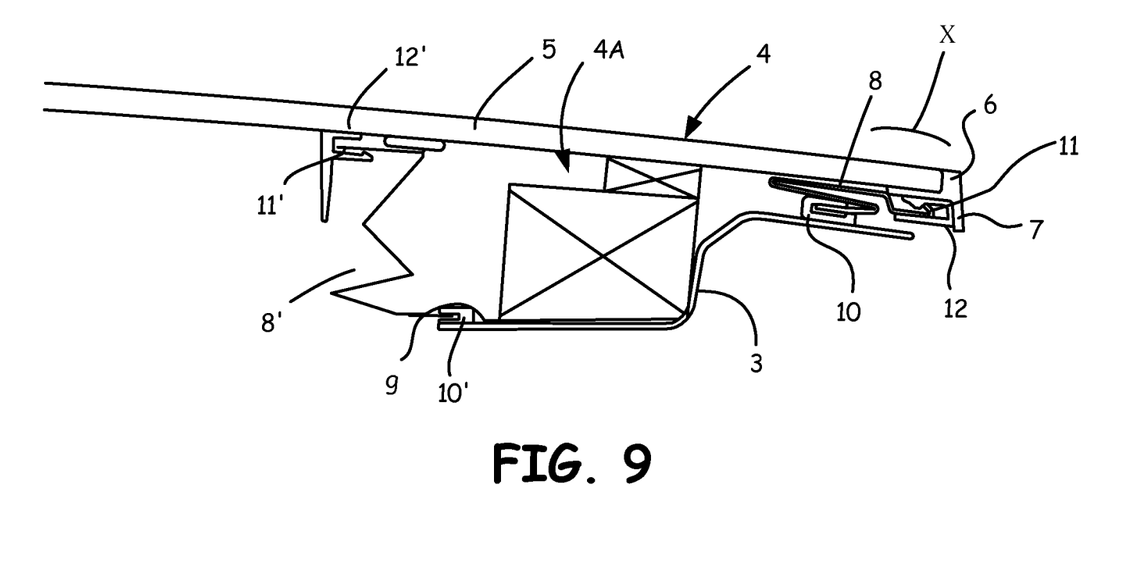
FIG. 9 is a sectional view corresponding to that of FIG. 8, but with the panel in its closed position.

The movements of panel 4 are caused by an operating mechanism 4A, which is shown schematically in FIGS. 8 and 9. As appreciated by those skilled in the art operating mechanisms can take numerous forms and typically include guides, sliding elements, levers and the like to raise and lower the panel 4 using commonly push-pull flexible elements operated manually or by a drive motor. The type of operating mechanism for purposes of the present invention is not relevant. One form of an operating mechanism is disclosed in US 2013/0161983, which is incorporated herein by reference thereto in its entirety.

FIGS. 2-9 show that a side cover 8 is provided at the side edges of panel 4, which side cover 8 extends substantially downwardly from each side edge of panel 4. The side cover 8, which extends at least over a large part of the side edges of roof opening 2, might have several functions. First of all, it hides the operating mechanism 4A of panel 4 from view, either from the outside of the vehicle and/or from the inside thereof as illustrated in FIG. 9. Furthermore, it might function to prevent wind noise and to prevent the wind blowing into the vehicle when the vehicle is driving with the panel 4 in the venting position. When panel 4 is moved to the venting position, the presence of the side covers 8 ensures that essentially a ventilation opening is only formed at the rear side of panel 4. Side cover 8 is preferably made of a flexible, elastically deformable plastic material, such as PU (polyurethane) or an elastomer like EDPM (ethylene propylene diene monomer (M-class) rubber), but also other materials are conceivable. The side cover may also be made, at least partially so, with more rigid materials, as will be explained later on.

Figure 4A:
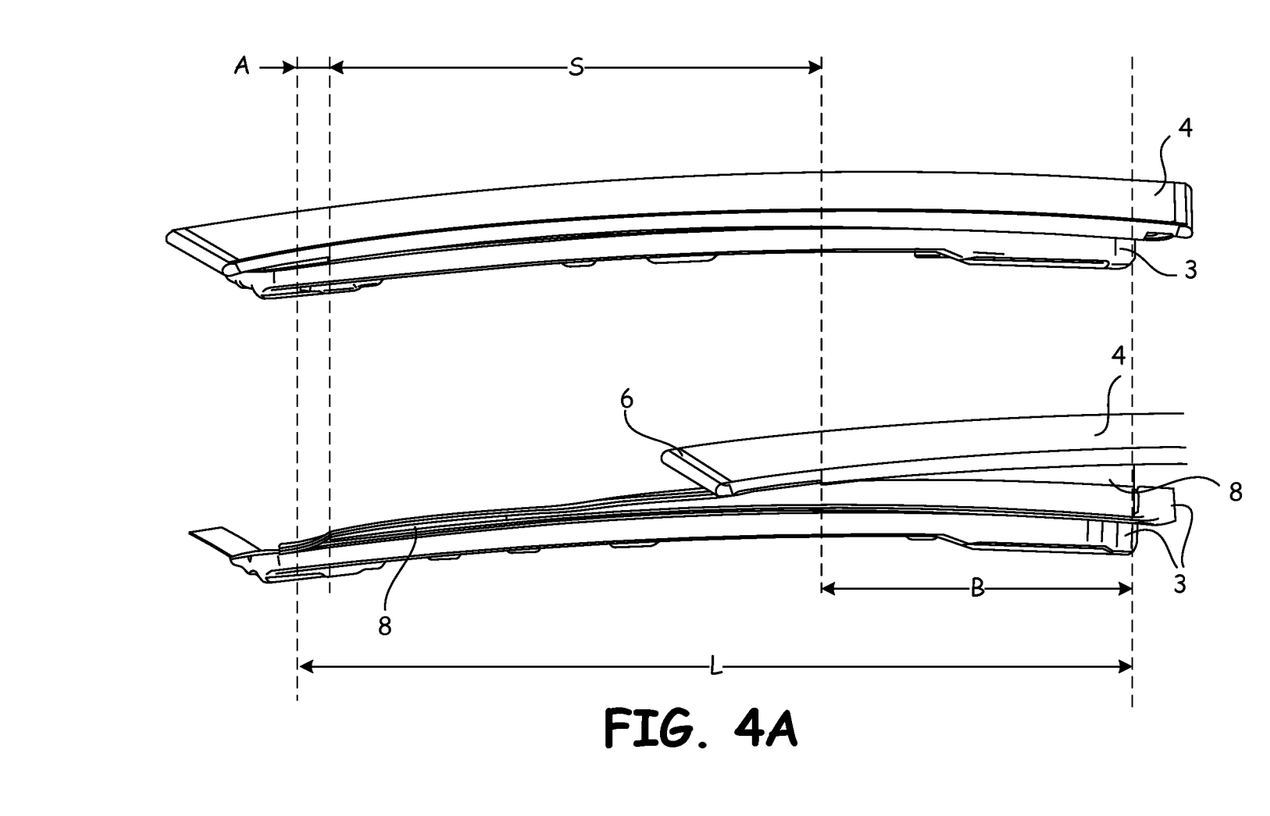
FIG. 4A shows two side views similar to that of FIG. 4 with the panel of the roof assembly in its closed and in its rear position to illustrate the sliding distance of the panel and other measures.
Figure 5:
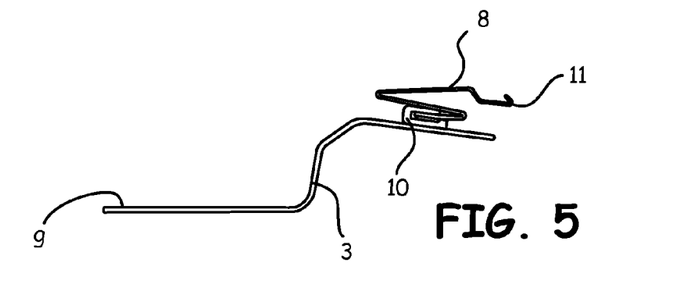
FIGS. 5-8 are sectional views according to the lines V-V, VI-VI, VII-VII and VIII-VIII in FIG. 4, respectively.

The lower side of side cover 8 is in this case fixed to stationary part 3 at a position outwardly of a region 9 where the operating mechanism 4A for panel 4 is arranged. However, it might also be connected to other fixed or movable parts, and also to the fixed roof 1. It may also be fixed inwardly of the operating mechanism 4A for panel 4. This operating mechanism 4A may be guided by a curved guide rail on stationary part 3 following the vertical and lateral curvatures of the side edges of panel 4. Thus, it will be mainly stationary with respect to stationary part 3 in sliding direction of panel 4. Side cover 8 has more or less a deformable harmonica or zigzag cross-section, so that it can follow movements of panel 4 by collapsing or extending in shape. In this embodiment it has two main folding lines (more folding lines are possible of course) and three sections adjacent to these folding lines. The lower section is attached to a mounting member 10 on stationary part 3 and the free end of the upper section at the upper side of side cover 8 is provided with a guide member 11 configured to engage a guide rail 12 below each side edge of panel 4 or inwardly thereof. The guide member 11 normally extends along the whole length of side cover 8, but guide rail 12 only starts at a distance A (see FIG. 4A) from the front end of side cover 8 (for example 10-150 mm) and extends rearwardly up to a point where it still guides the guide member 11 of side cover 8 when panel 4 is in its most forward position. The distance A being minimally $B_{min}$ and maximally:

$$A_{max}=L-S-B_{min}$$

wherein:
L=Length of side cover 8
S=maximum sliding movement of guide rail 12 of panel 4
$B_{min}$=Minimum overlap between guide member 11 of side cover 8 and guide rail 12 in the rear position of panel 4.

The length L of side cover 8 is normally measured between the point where the fixture of the front upper side or guide member 11 of side cover 8 ends and the rear end of side cover 8. The minimum overlap B is normally ca. 10-20 mm.

In FIG. 4A, B is the actual overlap between guide member 11 and guide rail 12. The minimum required overlap $B_{min}$ is much shorter, so that $A_{max}$ is much longer than A as illustrated in FIG. 4A.

Figure 3:
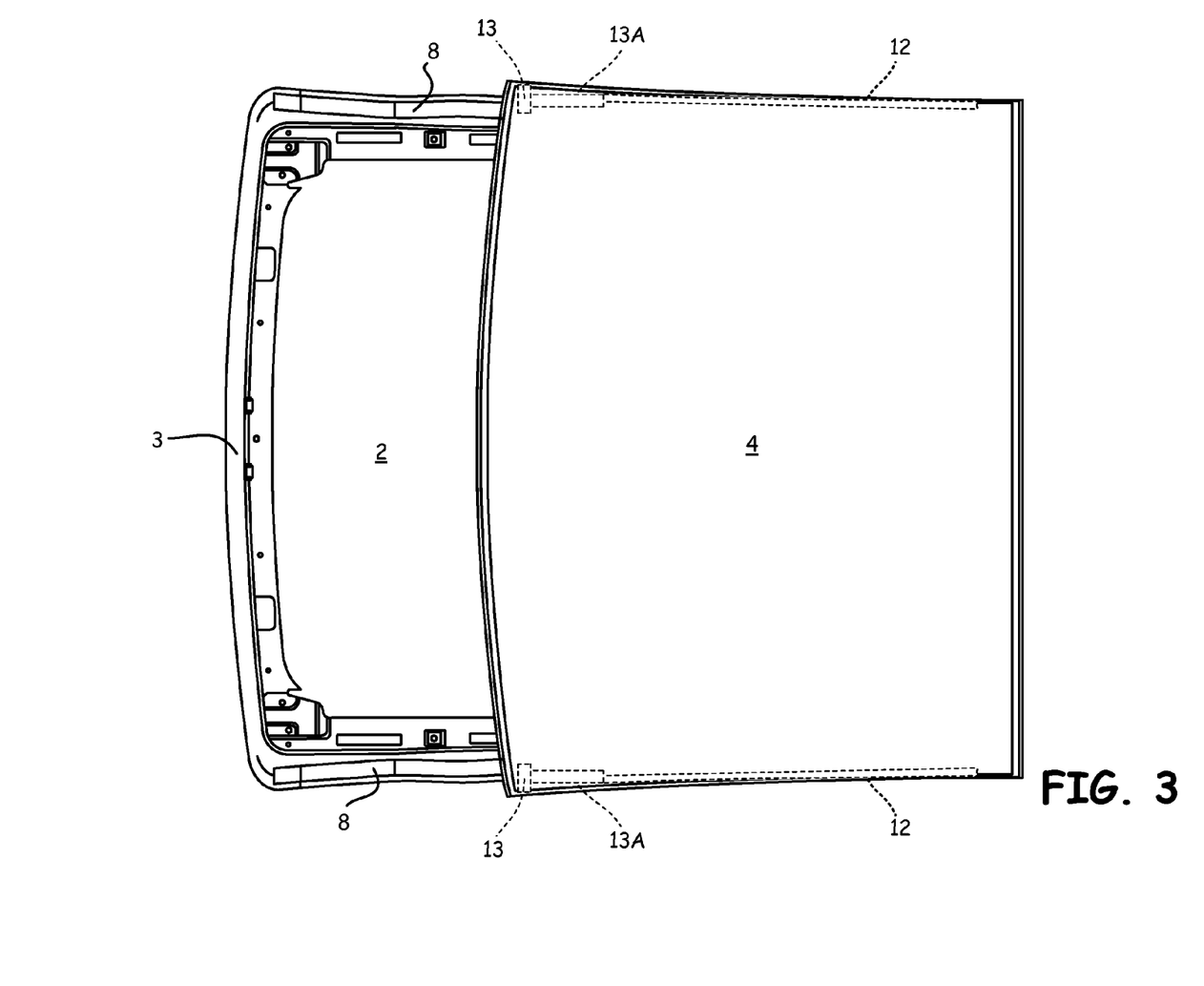
FIG. 3 is a plan view of the roof assembly of FIG. 2.

Guide rail 12 follows the 3D curvature of panel 4 and in this case extends substantially parallel to the side edge of the panel 4, and is thus also slightly curved laterally (see FIG. 3). The side edges of panel 4 flare out mostly near the front side of panel 4 and this means that guide rail 12 is not present where panel 4 has its maximum lateral curvature. Thus, guide member 11 is not forced to follow the most extreme lateral curvature of the panel because it is unguided near the front side of panel 4. To prevent rattling of the side cover 8 against panel 4, an auxiliary guide 13 is provided near the front side of panel 4. This auxiliary guide supports guide member 12 of side cover 8 only in a vertical direction, substantially not in a lateral direction, so that in its front portion, side cover 8 is free to take a lateral position with minimum deformation. This lateral freedom of movement could be complete freedom, or limited freedom.

In FIGS. 8 and 9, an inner side cover 8' is illustrated with mounting member 10', guide member 11' and guide member 12' in the open and closed positions, respectively.

In the embodiment shown, auxiliary guide 13 is mounted to panel 4 through a leaf spring 13A holding auxiliary guide 13 at a distance from the lower side of panel 4 when it is in positions with its rear side moved upwardly. Side cover 8 is thus biased in downward direction away from the lower side of panel 4. Due to the resiliency of leaf spring 13A it allows auxiliary guide 13 to move upwardly and be pressed against the lower side of panel 4 when it is in its closed position. Thus, the package height of the roof assembly is not increased.

Figure 6:
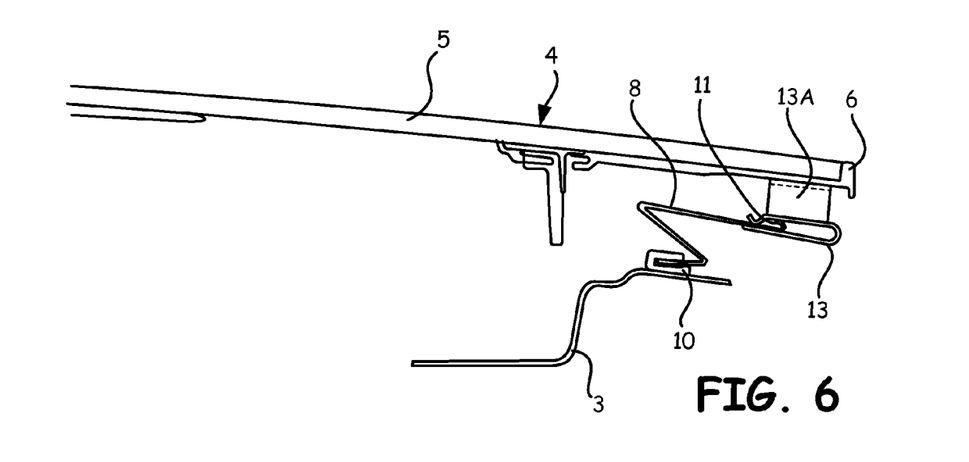
Figure 6A:
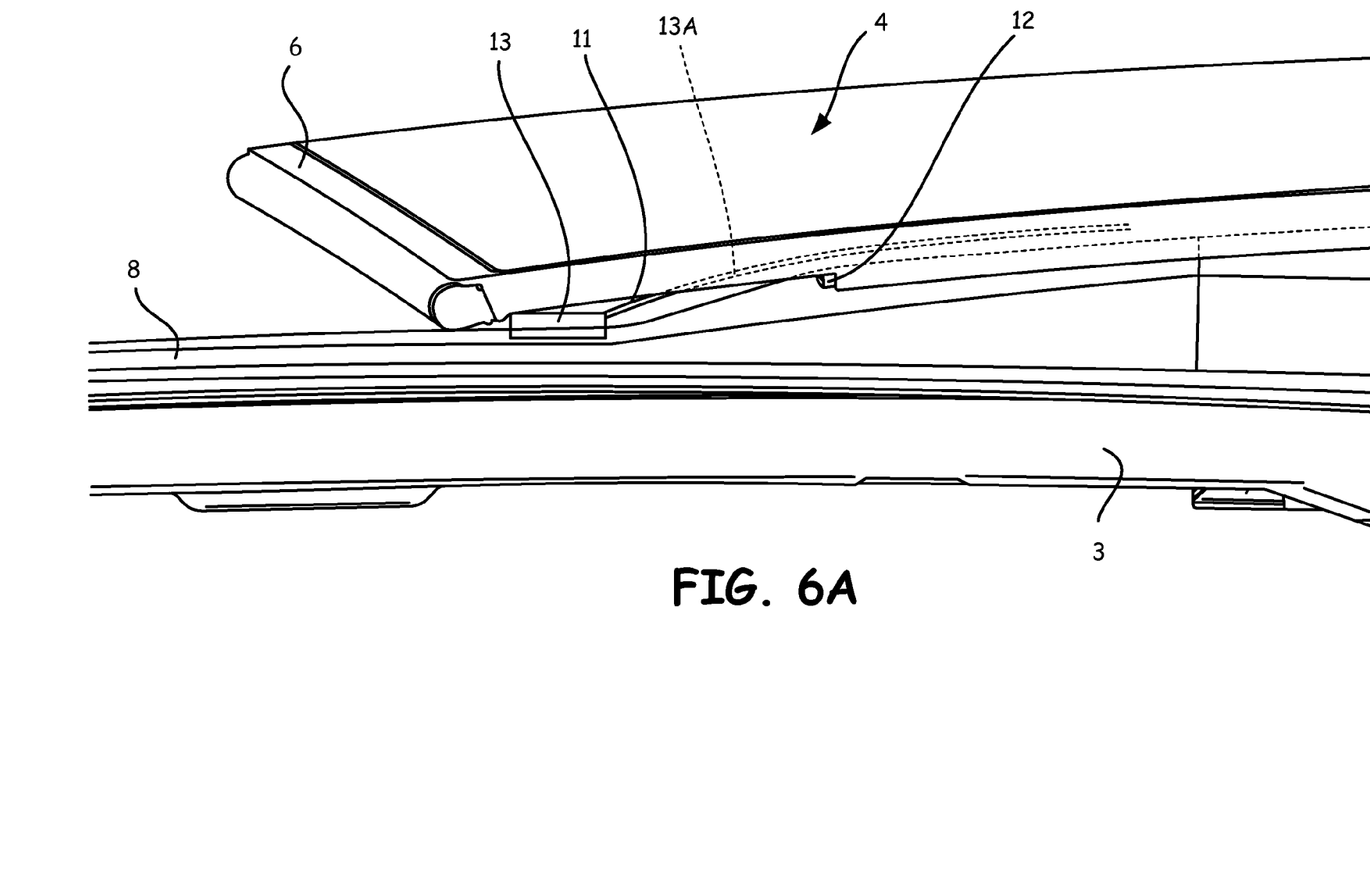
FIG. 6A shows detail VIA on a larger scale and with auxiliary guide illustrated.

FIGS. 6 and 6A show auxiliary guide 13, here in the form of a clip attached to the free end of leaf spring 13A which extends rearwardly up to or even beyond the front end of guide rail 12. Guide member 11 is free to move at least a limited distance in a lateral direction within auxiliary guide 13, and is held locally at a distance from the lower side of panel 4.

Figure 7:
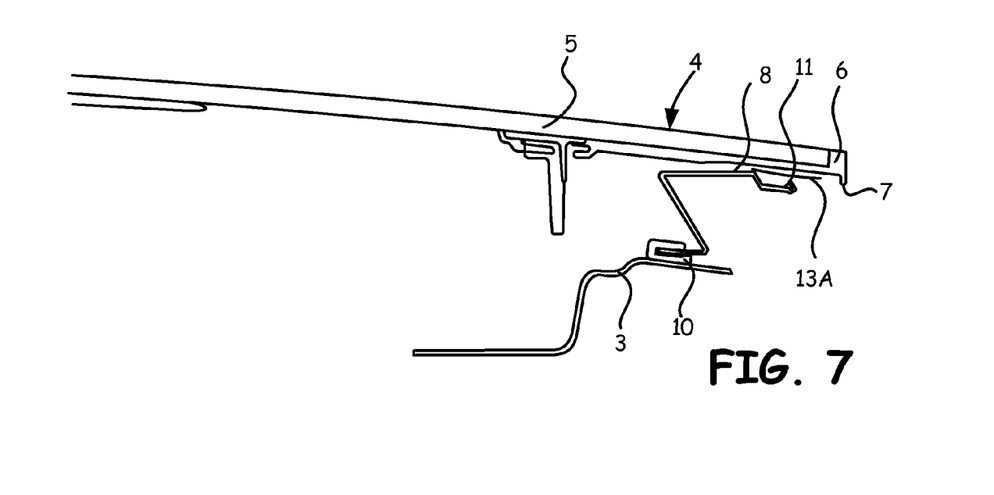
Figure 16:
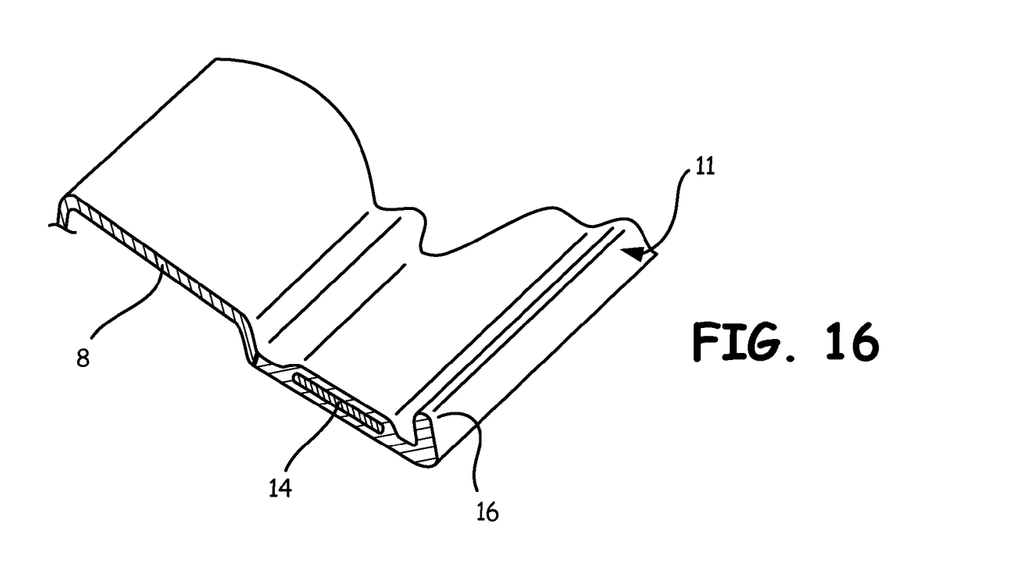
FIG. 16 is a view corresponding to that of FIG. 13, but on a larger scale and showing still another embodiment of the guide member.

FIGS. 3 and 7 show that there is a gap between auxiliary guide 13 and guiderail 12 where side cover 8 is unsupported. Because panel 4 slides with respect to side cover 8, different portions of side cover 8 are unsupported in different positions of panel 4. Thus, the main portion of side cover 8 should be able to be unsupported. This is of course also the case in the portion of side cover 8 that is in front of panel 4 when it is moved rearwardly. One way of reinforcing side cover 8, in particular at or near guide member 11 is by having an insert 14 of another material, such as spring steel or a more rigid type of plastic or the like, as is shown in FIG. 16. Insert 14 may extend the whole length of side cover 11, or at least in those portions that are unsupported in any position of panel 4. In this way, guide member 11 may be made from a material having good sliding properties without having to care about the resistance to sagging. This is prevented by insert 14.

It would of course also be possible to extend auxiliary guide 13 up to guide rail 12, or even to make them integral such as from a single unitary body, such that a part of the guide rail 12 guides guide member 11 vertically and laterally, while the front part only guides it vertically. In that case, vertical movement of auxiliary guide 13 will be less or even absent.

FIG. 3 shows that side cover 12 is slightly curved in a lateral direction. This can be caused by the lateral deformation of side cover 8 by guide rail 12, but the lower side of side cover does not have to run in a straight line, but could be curved locally, for example to pass around an element on stationary part 3.

FIGS. 5-8 show four different cross sections through side cover 8, showing side cover 8 in front of panel 4 (FIG. 5), supported by auxiliary guide 13 (FIG. 6), unsupported between auxiliary guide 13 and guide rail 12 (FIG. 7) and guided by guide rail 12 (FIG. 8). FIG. 9 again shows the cross section of FIG. 8, but now with panel 4 in its closed position.

Figure 10:
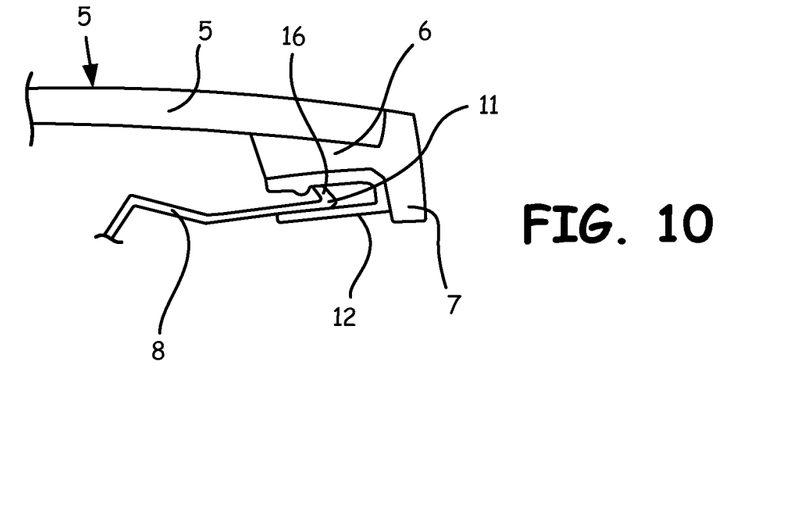
FIGS. 10-12 are views corresponding to detail X in FIG. 9, but showing three different embodiments of the guide rail for the side cover.
Figure 11:
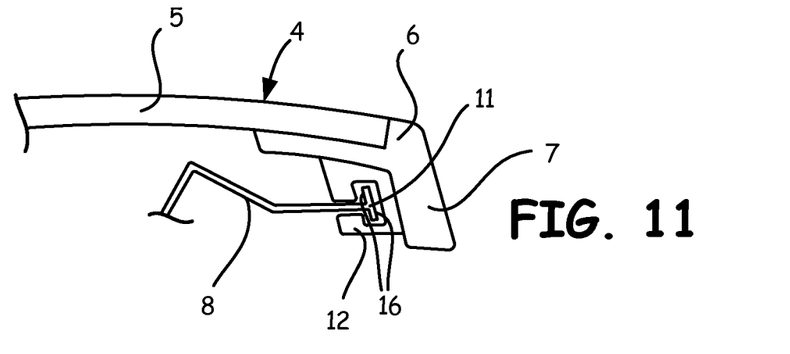
Figure 12:
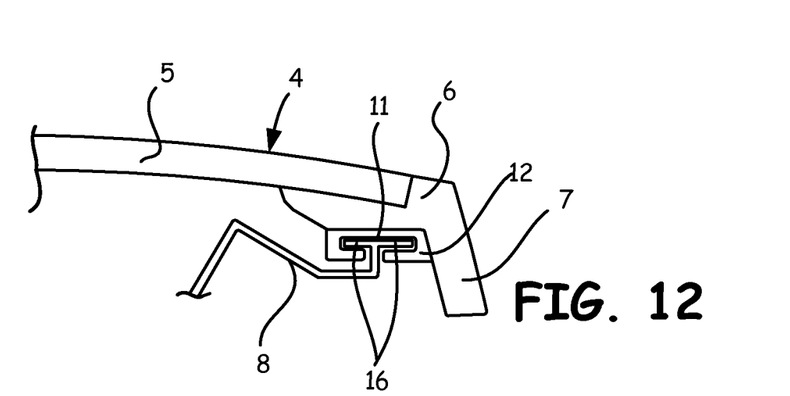

FIGS. 10-12 show alternative embodiments of guide member 11 and guide rail 12. In all embodiments, guide rail 12 is formed as an extrusion profile, but other ways of manufacturing are possible.

In FIG. 10, guide rail 12 is slightly tilted sideways, in this case inwardly. The advantage thereof is that any water in the guide rail 12 can be drained off thereby preventing the guide member 11 from freezing to guide rail 12, and thus preventing or hindering a sliding movement of panel 4.

In FIG. 11, the guide member 11 is formed with two, opposite flanges 16 instead of one as in FIG. 10, thereby increasing the pull-out resistance.

In FIG. 12, guide member 11 is again formed with two opposite flanges 16, but the cover enters the guide rail from below, so that the opening may again prevent water to remain in the guide rail.

Figures 13, 14, 15:
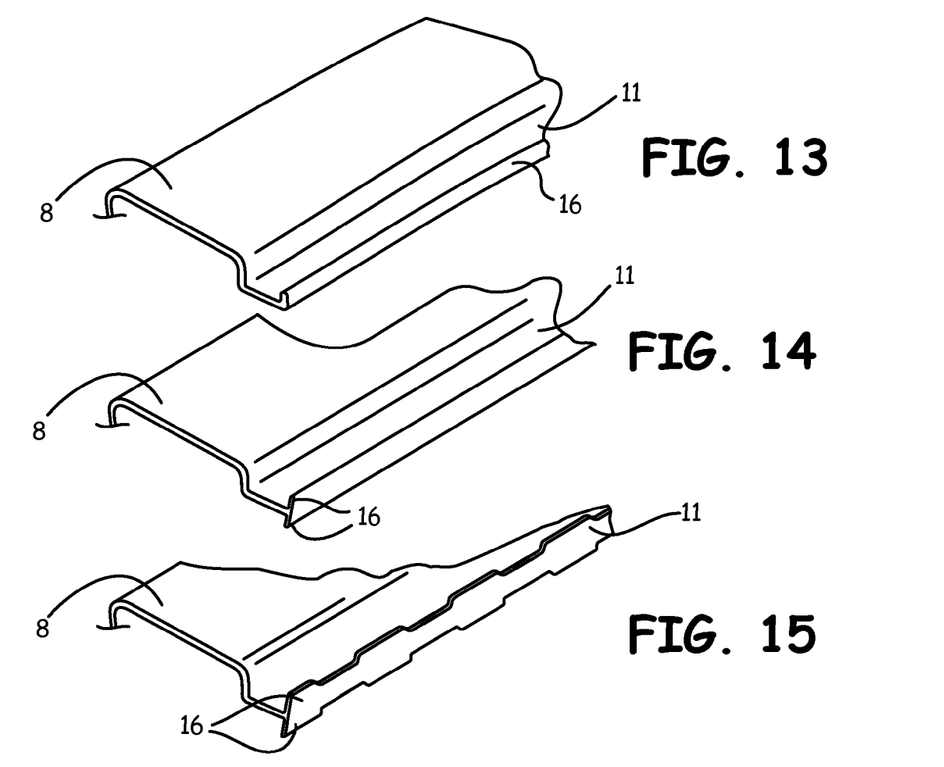
FIGS. 13-15 are perspective views of a part of the guide member of the side covers shown in FIGS. 10-12, respectively.

FIGS. 13-15 show in perspective view guide member 11 with one guide flange 16 (FIG. 13), guide member 11 with two flanges 16 (FIG. 14) and guide member 11 with interrupted flanges 16 (FIG. 15). These interruptions promote a cleaning/scraping effect so that any dirt in the guide rail 12 is scraped-off, and if one or more openings are present in guide rail 12, this dirt can easily be removed as well.

FIG. 16 shows the reinforcement, in this case insert 14, as already discussed above. The reinforcement prevents sagging and deformation of side cover 8 both when guide member 11 is unsupported and upon entrance into the guide rail 12. This would be more difficult if side cover 8 has not sufficient resistance to deformation.

Figures 17, 18, 19:
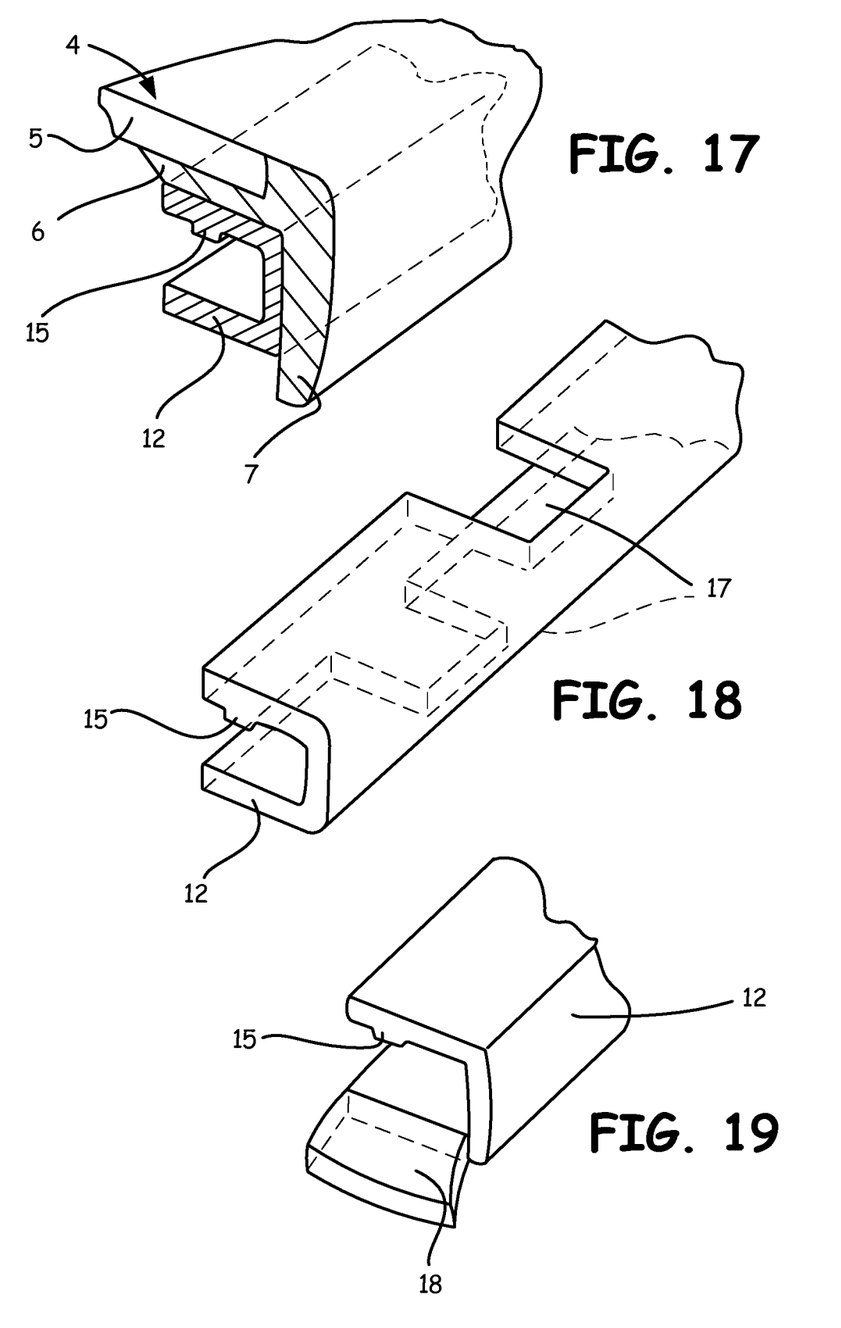
FIGS. 17-19 are large-scale perspective views of the front end portion of three embodiments of the guide rail for the side cover.

FIGS. 17-19 show different types of guide rails 12 for a guide member 11 according to FIG. 13. FIG. 17 shows a standard guide rail 12 and encapsulation 6 having downward flange 7 covering guide rail 12. In FIG. 18, openings 17 are made in the upper and lower flange of guide rail 12 to promote removal of dirt and moisture, and may thus be favorably combined with guide member 11 of FIG. 15. In FIG. 19, the front end of guide rail 12 is provided with a rounded entrance flange 18 to guide the guide member of side cover 8 into guide rail 12 without danger of damaging the guide member or without the risk of a part of the guide member hooking behind a sharp edge of the guide rail. The entrance flange 18 or other member facilitating entry of the guide member could also be provided on the side and top of the guide rail.

The invention is not limited to the above-described embodiment as shown in the drawing, which can be varied in several ways within the scope of the invention. Different aspects of the various embodiments may be combined in other manners.

For example, the side cover 8 may also be attached to the stationary part 3 or the like in another way, such as by gluing. In the embodiments shown, the upper and lower sides of side cover 8 are laterally offset, but they may also be positioned more vertically aligned. However, lateral offset may decrease package height as guide rail 12 and mounting member 10 may vertically overlap. It is furthermore conceivable that a part of the side edges of the panel 4 extend parallel to each other and only the front part of the side edges are laterally curved. In that case, the guide rails will be mainly present in the parallel parts of the side edges, and thus also extend mainly straight and possibly also parallel.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A roof assembly for a vehicle having an opening in a fixed roof, which roof assembly comprises:
    a stationary part;
    at least one rigid panel movably supported by the stationary part through an operating mechanism, which panel is movable between a closed position, in which the panel closes the opening in the fixed roof, and a rear position, in which the panel is moved with a rear side upwardly and slid rearwardly;
    a downwardly extending side cover connected to side edges of said panel and to the stationary part, which side cover hiding the operating mechanism from a side view and having front and rear ends, the side cover being substantially stationary in a longitudinal direction with respect to the stationary part;
    a guide rail joined to the panel, the side cover being slidably guided in the guide rail, said guide rail being configured to guide the side cover in vertical and lateral directions, wherein the guide rail only starts at a distance from the front end of the side cover when the panel is in the closed position; and
    an auxiliary guide is provided near the front of the panel and configured to guide the side cover in a vertical direction, but allowing substantial lateral movement thereof.

2. The roof assembly according to claim 1, wherein the auxiliary guide is positioned at a distance from the guide rail.

3. The roof assembly according to claim 1, wherein the auxiliary guide comprises a biasing element configured to bias the side cover in a downward direction when the panel is in a position with the rear side upwardly, and allowing the side cover to be pressed against the lower side of the panel when the panel is in the closed position.

4. The roof assembly according to claim 1, wherein the side cover is provided with a guide member near an upper side of the side cover, the guide member being configured to be guided at least by the guide rail.

5. The roof assembly according to claim 4, wherein the side cover is mainly made of a flexible material, while the guide member of the side cover is made of another material.

6. The roof assembly according to claim 5, wherein the flexible material is an elastomer.

7. The roof assembly according to claim 6, wherein guide member is made of a wear resistant plastic material.

8. The roof assembly according to claim 5, wherein guide member is made of a wear resistant plastic material.

9. The roof assembly according to claim 1, wherein the guide rail is provided with at least a flared edge on a front end.

10. The roof assembly according to claim 4, wherein the guide member extends along substantially the entire length of the side cover, but is interrupted in a longitudinal direction.

11. The roof assembly according to claim 1, wherein the guide rail is open in a downward direction.

12. The roof assembly according to claim 1, wherein the guide rail has one or more openings, at least in a downward direction.

13. The roof assembly according to claim 1, wherein the side cover is provided with at least two folding lines to fold the side cover in a zigzag fashion when the panel is moved to the closed position in the opening in the fixed roof.

14. The roof assembly according to claim 1, wherein a width of the panel varies along a length thereof.

15. The roof assembly of claim 14 wherein side edges of the panel have a lateral curvature in a plan view, and the guide rail extends parallel to the respective side edge.

16. The roof assembly according to claim 15, wherein the lateral curvature of the side edges of the panel is maximally near a front side thereof.

17. The roof assembly according to claim 1, wherein the panel includes an at least partly transparent sheet material and an edge of encapsulating material extends downwardly from the sheet material at least on side edges of the panel to mainly cover the guide rail.

18. A roof assembly for a vehicle having an opening in a fixed roof, which roof assembly comprises:
    a stationary part;
    at least one rigid panel movably supported by the stationary part through an operating mechanism, which panel is movable between a closed position, in which the panel closes the opening in the fixed roof, and a rear position, in which the panel is moved with a rear side upwardly and slid rearwardly;
    a downwardly extending side cover connected to side edges of said panel and to the stationary part, which side cover hiding the operating mechanism from a side view and having front and rear ends, the side cover being substantially stationary n a longitudinal direction with respect to the stationary part, the side cover being provided with a guide member near an upper side of the side cover;
    a guide rail joined to the panel, the side cover being slidably guided in the guide rail, said guide rail being configured to guide the side cover in vertical and lateral directions, wherein the guide rail only starts at a distance from the front end of the side cover when the panel is in the closed position, the guide member being configured to be guided at least by the guide rail; and an auxiliary guide provided near the front of the panel and configured to guide the side cover in a vertical direction, but allowing substantial lateral movement thereof and wherein the side cover is provided with a reinforcing element at or near the guide member, extending in the forward position of the panel at least between the auxiliary guide and the guide rail.

19. The roof assembly according to claim 1, wherein the distance is minimally $B_{min}$ and maximally:

$$A_{max} = L - S - B_{min}$$

wherein:
L = length of side cover,
S = maximum sliding movement of guide rail of panel, and
$B_{min}$ = minimum overlap between side cover and guide rail in rear position of panel.

* * * * *